(12) United States Patent
Frankenbach

(10) Patent No.: US 11,106,962 B2
(45) Date of Patent: Aug. 31, 2021

(54) APPARATUS FOR ARRANGING AN ELECTRONIC DATA CARRIER ON A COMPONENT OF A FLUIDIC SYSTEM

(71) Applicant: GEMUE GEBR. MUELLER APPARATEBAU GMBH & CO. KOMMANDITGESELLSCHAFT, Ingelfingen (DE)

(72) Inventor: Klaus Frankenbach, Forchtenberg-Schleierhof (DE)

(73) Assignee: GEMUE GEBR. MUELLER APPARATEBAU GMBH & CO. KOMMANDITGESELLSCHAFT, Ingelfingen (DE)

( * ) Notice: Subject to any disclaimer, the term of this patent is extended or adjusted under 35 U.S.C. 154(b) by 0 days.

(21) Appl. No.: 15/946,050

(22) Filed: Apr. 5, 2018

(65) Prior Publication Data
US 2018/0293482 A1    Oct. 11, 2018

(30) Foreign Application Priority Data

Apr. 10, 2017    (DE) .................... 10 2017 107 705.7

(51) Int. Cl.
*G06K 19/077* (2006.01)
*G06K 19/07* (2006.01)
*G09F 3/03* (2006.01)

(52) U.S. Cl.
CPC ... *G06K 19/07758* (2013.01); *G06K 19/0723* (2013.01); *G09F 3/0317* (2013.01); *G09F 3/0323* (2013.01); *G09F 3/0329* (2013.01); *G09F 3/0352* (2013.01)

(58) Field of Classification Search
CPC .......... G06K 19/07758; G06K 19/0723; G09F 3/0317; G09F 3/0323; G09F 3/0329; G09F 3/0352
See application file for complete search history.

(56) References Cited

U.S. PATENT DOCUMENTS 4,766,419 A * 8/1988 Hayward ............. G07C 5/0858
340/545.2
5,042,181 A * 8/1991 Fortsch ..................... G09F 3/14
292/307 R (Continued)

FOREIGN PATENT DOCUMENTS

DE        2428731 A1     1/1976
DE    102008025061 A1    12/2009

(Continued)

OTHER PUBLICATIONS

German Search Report dated Aug. 24, 2018, pp. 1-9.

*Primary Examiner* — Daniel I Walsh
(74) *Attorney, Agent, or Firm* — Bond Schoeneck & King, PLLC; George McGuire

(57) ABSTRACT

An apparatus for arranging an electronic data carrier on a component of a fluidic system is proposed. The apparatus includes the electronic data carrier. An insert is provided that can be inserted into a main body, which insert, in a first position with respect to the main body, vacates a release space in order for at least one cable portion of a cable to be introduced. In a second position with respect to the main body, the insert secures itself and the at least one cable portion to the main body such that they cannot be pulled out.

7 Claims, 4 Drawing Sheets

(56) References Cited

U.S. PATENT DOCUMENTS

Figure 1:
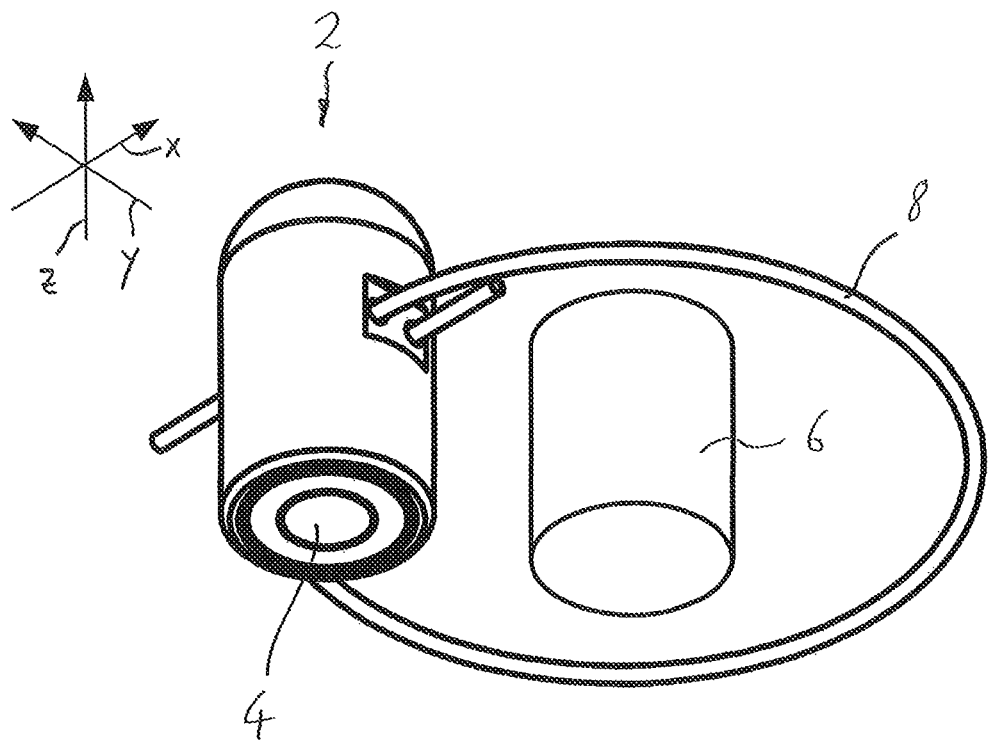

| | | | | |
|---|---|---|---|---|
| 5,120,097 | A | * | 6/1992 | Fattori .................... G09F 3/037 292/307 A |
| 5,167,626 | A | * | 12/1992 | Casper .................. A61B 5/073 600/582 |
| 6,050,622 | A | * | 4/2000 | Gustafson ................ E06B 9/68 292/307 R |
| 6,128,932 | A | * | 10/2000 | Mainetti .............. G09F 3/0311 292/307 R |
| 6,178,841 | B1 | | 1/2001 | Ruckert et al. |
| 6,200,341 | B1 | * | 3/2001 | Jones .................... A61F 2/2409 623/2.1 |
| 6,420,971 | B1 | * | 7/2002 | Leek ...................... E05B 39/04 340/542 |
| 6,588,812 | B1 | * | 7/2003 | Garcia .................. G09F 3/0352 292/307 A |
| 6,888,241 | B1 | * | 5/2005 | Korn .................... G09F 3/0323 257/728 |
| 7,183,914 | B2 | * | 2/2007 | Norman .............. G08B 13/2434 340/568.1 |
| 7,429,927 | B2 | * | 9/2008 | Bonalle .............. G08B 13/2434 340/10.1 |
| 7,685,850 | B2 | * | 3/2010 | Nilsson ................ G09F 3/0329 70/18 |
| 9,679,235 | B2 | * | 6/2017 | Sugar .................. G06K 19/0716 |
| 9,978,580 | B2 | * | 5/2018 | Johnson .................. H01J 61/56 |
| 10,186,176 | B2 | * | 1/2019 | Nazzari ................ G09F 3/0364 |
| 2002/0171550 | A1 | * | 11/2002 | Hirose .............. E05B 47/0603 340/572.9 |
| 2005/0116827 | A1 | * | 6/2005 | Feibelman ............ G09F 3/0329 340/572.9 |
| 2005/0128089 | A1 | * | 6/2005 | Feibelman ............ G09F 3/0364 340/572.9 |
| 2005/0231365 | A1 | * | 10/2005 | Tester .............. G06K 19/07798 340/568.1 |
| 2006/0087431 | A1 | * | 4/2006 | Shieh ................ B65D 63/1081 340/572.1 |
| 2006/0109118 | A1 | * | 5/2006 | Pelo .................... G06K 19/077 340/572.1 |
| 2006/0145873 | A1 | * | 7/2006 | Feibelman ......... G08B 13/2434 340/572.9 |
| 2006/0150456 | A1 | * | 7/2006 | Sar-El ...................... B65C 7/00 40/637 |
| 2006/0170550 | A1 | * | 8/2006 | Marsilio ............ G08B 13/2434 340/568.2 |
| 2006/0202833 | A1 | * | 9/2006 | Norman ............. G08B 13/2434 340/572.9 |
| 2006/0220880 | A1 | * | 10/2006 | Yasur ...................... G08B 21/22 340/573.1 |
| 2007/0012772 | A1 | * | 1/2007 | Cooper .............. E05B 73/0017 235/435 |
| 2007/0057788 | A1 | * | 3/2007 | Wu ...................... G09F 3/0358 340/572.1 |
| 2007/0069529 | A1 | * | 3/2007 | Nilsson .............. E05B 73/0052 292/315 |
| 2007/0120381 | A1 | * | 5/2007 | Ehrensvard ........... G09F 3/0352 292/307 R |
| 2007/0207644 | A1 | * | 9/2007 | Pollmann .......... B29C 45/14639 439/131 |
| 2007/0228309 | A1 | * | 10/2007 | Friedman .............. F16K 11/044 251/65 |
| 2008/0042842 | A1 | | 2/2008 | Ulibarri |
| 2008/0045069 | A1 | * | 2/2008 | Haren ................ G08B 13/1409 439/352 |
| 2008/0072633 | A1 | * | 3/2008 | Samuel .............. E05B 67/003 70/58 |
| 2008/0315596 | A1 | * | 12/2008 | Terry .................... G09F 3/0317 292/327 |
| 2009/0199448 | A1 | * | 8/2009 | Baba ...................... G06K 19/04 40/642.02 |
| 2009/0303046 | A1 | * | 12/2009 | Eckert ................ E05B 45/005 340/568.4 |
| 2010/0090830 | A1 | * | 4/2010 | Conti .................. E05B 73/0029 340/571 |
| 2010/0148962 | A1 | * | 6/2010 | Nguyen .............. E05B 73/0017 340/572.1 |
| 2010/0231474 | A1 | * | 9/2010 | Yamagajo ............. H01Q 1/2216 343/767 |
| 2010/0245075 | A1 | * | 9/2010 | Stevens .................. G06Q 10/08 340/539.1 |
| 2010/0319413 | A1 | * | 12/2010 | Nilsson .............. E05B 73/0005 70/18 |
| 2010/0326219 | A1 | * | 12/2010 | Nelson .................. B65D 63/00 73/865.8 |
| 2011/0102179 | A1 | * | 5/2011 | Ezzo .................... E05B 73/0017 340/568.1 |
| 2011/0226856 | A1 | * | 9/2011 | Meilland ............ G06K 19/041 235/488 |
| 2011/0283750 | A1 | * | 11/2011 | Will ...................... E05B 45/005 70/18 |
| 2012/0024962 | A1 | * | 2/2012 | Kolton .................. B65D 23/14 235/492 |
| 2012/0031154 | A1 | * | 2/2012 | Spiegel ................ E05B 37/025 70/15 |
| 2012/0085134 | A1 | * | 4/2012 | Ezzo .................... E05B 73/0017 70/15 |
| 2012/0227446 | A1 | * | 9/2012 | Shute .................. E05B 45/005 70/15 |
| 2012/0229975 | A1 | * | 9/2012 | Yang .................... B65D 63/14 361/679.57 |
| 2012/0297652 | A1 | * | 11/2012 | Halvorsen ............. E21B 17/006 40/661.05 |
| 2013/0026771 | A1 | * | 1/2013 | Nazzari ................ G09F 3/0352 292/317 |
| 2013/0067967 | A1 | * | 3/2013 | Olear .................. E05B 73/0005 70/18 |
| 2013/0140367 | A1 | * | 6/2013 | Binmore ........... G06K 19/07758 235/492 |
| 2014/0017025 | A1 | * | 1/2014 | Hemingway ......... F16B 1/0014 411/15 |
| 2014/0130554 | A1 | * | 5/2014 | Su ........................ E05B 73/0082 70/15 |
| 2015/0020558 | A1 | * | 1/2015 | Williams ................ B62H 5/00 70/18 |
| 2015/0108223 | A1 | * | 4/2015 | Weitzhandler ......... B60K 15/04 235/492 |
| 2015/0154891 | A1 | * | 6/2015 | Baschnagel .............. B43L 1/00 40/331 |
| 2015/0179035 | A1 | * | 6/2015 | Christianson ...... G08B 13/2402 340/572.1 |
| 2015/0243146 | A1 | * | 8/2015 | Sayegh ................. G08B 13/1463 340/572.8 |
| 2015/0287299 | A1 | * | 10/2015 | Eckert ................ G08B 13/1418 340/568.2 |
| 2015/0310715 | A1 | * | 10/2015 | Nekoogar .............. G08B 13/06 340/572.1 |
| 2015/0339499 | A1 | * | 11/2015 | Nekoogar .............. G08B 21/00 340/10.1 |
| 2016/0327416 | A1 | * | 11/2016 | Gagne .................... G01F 15/14 |
| 2017/0089496 | A1 | * | 3/2017 | Lennon ................ G01M 5/0083 |
| 2017/0162014 | A1 | * | 6/2017 | Zhang ................ G08B 13/1454 |
| 2017/0254838 | A1 | * | 9/2017 | Sugar ................ G01R 19/0092 |
| 2017/0284128 | A1 | * | 10/2017 | Lim ...................... E05B 39/005 |
| 2018/0163435 | A1 | * | 6/2018 | Yang .................... E05B 73/0029 |
| 2018/0293482 | A1 | * | 10/2018 | Frankenbach .......... G09F 3/0317 |
| 2019/0017294 | A1 | * | 1/2019 | Sternlight ........... G07C 9/00309 |
| 2019/0027009 | A1 | * | 1/2019 | Miettinen ........... G08B 13/1463 |
| 2019/0080631 | A1 | * | 3/2019 | Grapsa .................. G09F 3/0335 |
| 2021/0172202 | A1 | * | 6/2021 | Linz ...................... E05B 45/005 |

FOREIGN PATENT DOCUMENTS

| | | |
|---|---|---|
| EP | 1087334 A1 | 3/2001 |
| FR | 1023017 A | 3/1953 |

* cited by examiner

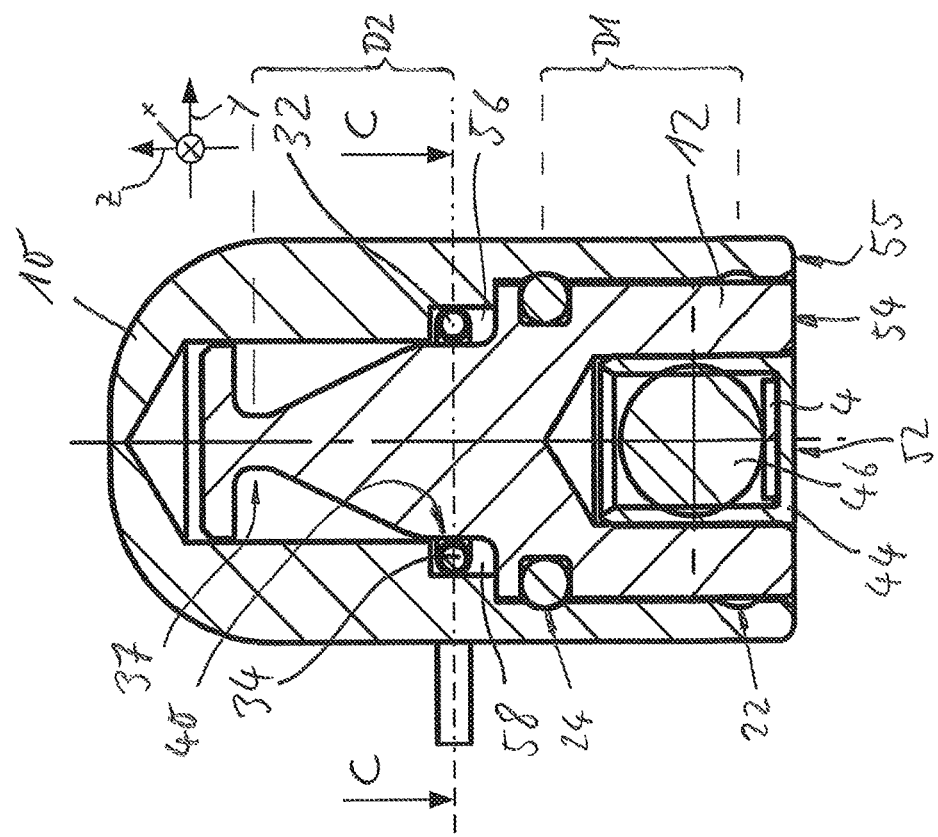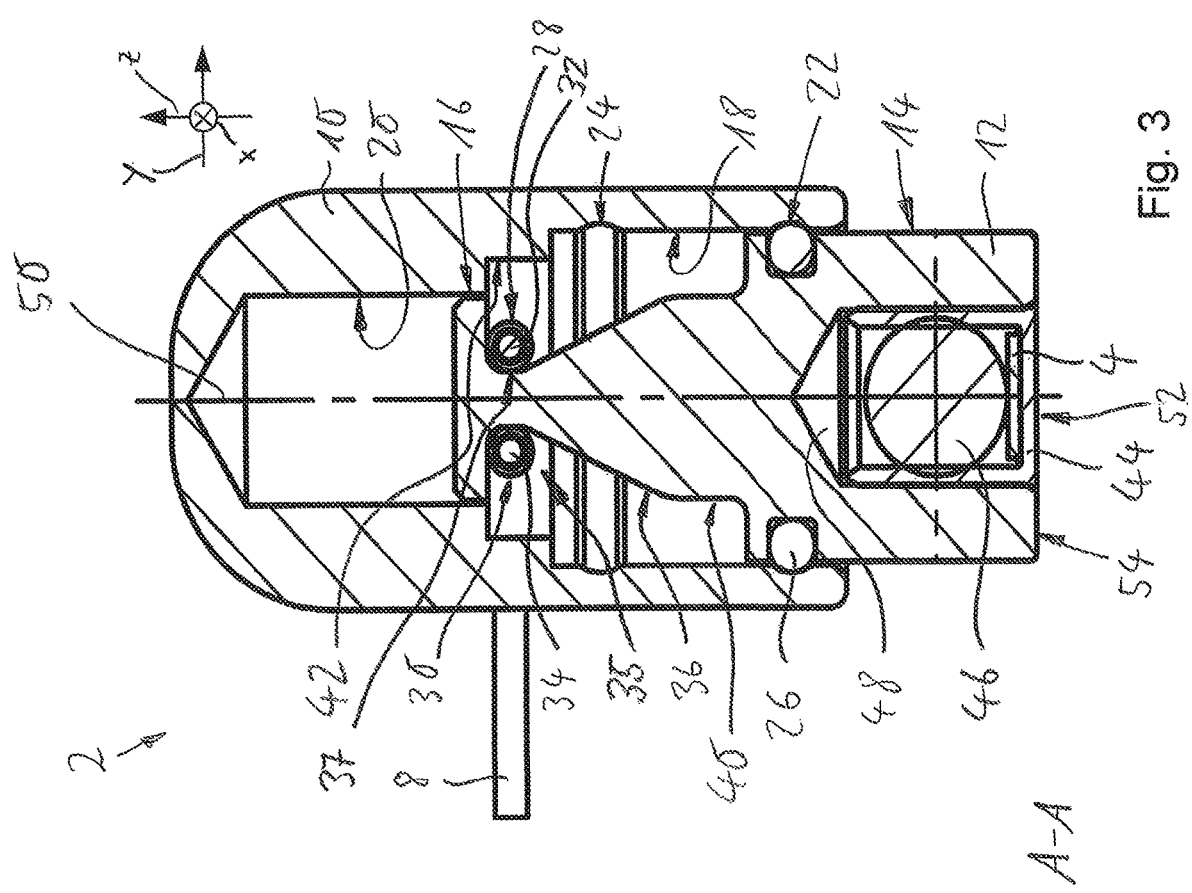

APPARATUS FOR ARRANGING AN ELECTRONIC DATA CARRIER ON A COMPONENT OF A FLUIDIC SYSTEM

CROSS-REFERENCE TO RELATED APPLICATIONS

This application relates and claims priority to German Application No. DE102017107705.7, filed Apr. 10, 2017, the entire disclosure of which is incorporated herein by reference.

The invention relates to an apparatus for arranging an electronic data carrier on a component of a fluidic system.

Membrane valves are known in which a valve membrane is fitted with an RFID chip. This makes it possible for data not only relating to the materials, the dimensions, the production or similar parameters of the membrane to be stored in the data carrier and/or digitally referenced in the system, but also data relating to the customers or the shipment. The provision of an RFID chip therefore increases the traceability of a valve membrane. Reference is made for example to DE 10 2013 214 304 A1.

Therefore, the object of the invention consists in providing traceability for further components, or components not yet provided with an RFID chip, of a fluidic system.

According to the invention, the apparatus comprises the electronic data carrier, and an insert is provided that can be inserted into a main body. In a first position with respect to the main body, the insert vacates a release space in order for at least one cable portion of a cable to be introduced. In a second position with respect to the main body, the insert secures itself and the at least one cable portion to the main body such that they cannot be pulled out.

Said apparatus permits the one-time arrangement of the cable guided around the component such that it cannot be pulled out, and therefore permits the one-time arrangement of the data carrier on the particular fluidic component. The securing of the insert and of the cable portion such that they cannot be pulled out advantageously prevents the subsequent removal of the cable from the apparatus. However, if the cable is severed or if the cable is removed from the apparatus, the same apparatus cannot then be arranged again on the component by securing the insert such that it cannot be pulled out.

An apparatus that is protected against intentional or unintentional manipulation is therefore provided, by means of which the associated technical component can be clearly identified electronically. This is advantageous particularly for existing fluidic systems, as it is possible to simply and safely retrofit an electronic data carrier.

In a first development of the apparatus, the electronic data carrier is arranged in a distal region of the insert. In this way, a compact apparatus that is optimized to the installation space can be advantageously provided.

Furthermore, it is particularly advantageous for the electronic data carrier to be arranged at a base of a container, the container being arranged in a recess in the apparatus such that the base thereof faces outwards.

This results in the electronic data carrier being protected from environmental influences and at the same time being arranged so as to be readable at an exposed point on the apparatus.

In one development, the container is produced from PTFE. The cleanability of the apparatus is thus improved.

One advantageous embodiment of the apparatus is characterized in that the insert comprises a securing portion which, in the second position and together with the main body, defines a fixing channel for the cable portion, the fixing channel having a kink in the course thereof. This results in the cable portion being forced into the kink and thereby secured to the apparatus in a form-fitting manner.

One further advantageous embodiment is characterized in that the insert and the main body are designed such that two cable portions can be introduced and secured. This allows a flexible installation in which the cable to be used is cut to length according to requirements.

In an alternative embodiment, a cable comprising a cable portion is rigidly connected to the main body. The installation is simplified by the provision of the cable on the apparatus.

In the second position, the insert is advantageously received in the main body such that a distal lateral surface of the insert is covered by the main body. Thus, no lateral clamping force can be exerted on the insert. Subsequent removal of the insert is therefore prevented.

In the second position of the insert with respect to the main body, a distal end surface of the insert is flush with an end surface of the main body. Removal of the insert from the main body is prevented by this flush closure. Furthermore, advantages are gained from the contactless reading of the electronic data carrier and from the cleanability of the apparatus.

One advantageous embodiment is characterized in that an annular groove for securing the insert in the second position is arranged between a first and a second inner cylinder of the main body, a first guide portion of the insert being axially guided in the first inner cylinder, and a second guide portion of the insert being axially guided in the second inner cylinder. As a result, the insert is axially guided in the main body. This in turn has a positive effect on the secure engagement in the second position.

One further aspect of the process relates to a method for arranging the apparatus on a component of a fluidic system, in particular on a pipeline segment, on a valve body, on a drive body or on an intermediate segment. The method comprises: arranging the cable around the component; introducing the at least one cable portion into the apparatus; and pushing the insert into the main body. Thus, the apparatus can be easily installed and the cable can advantageously be secured to the apparatus such that it cannot be removed.

Figure 2:
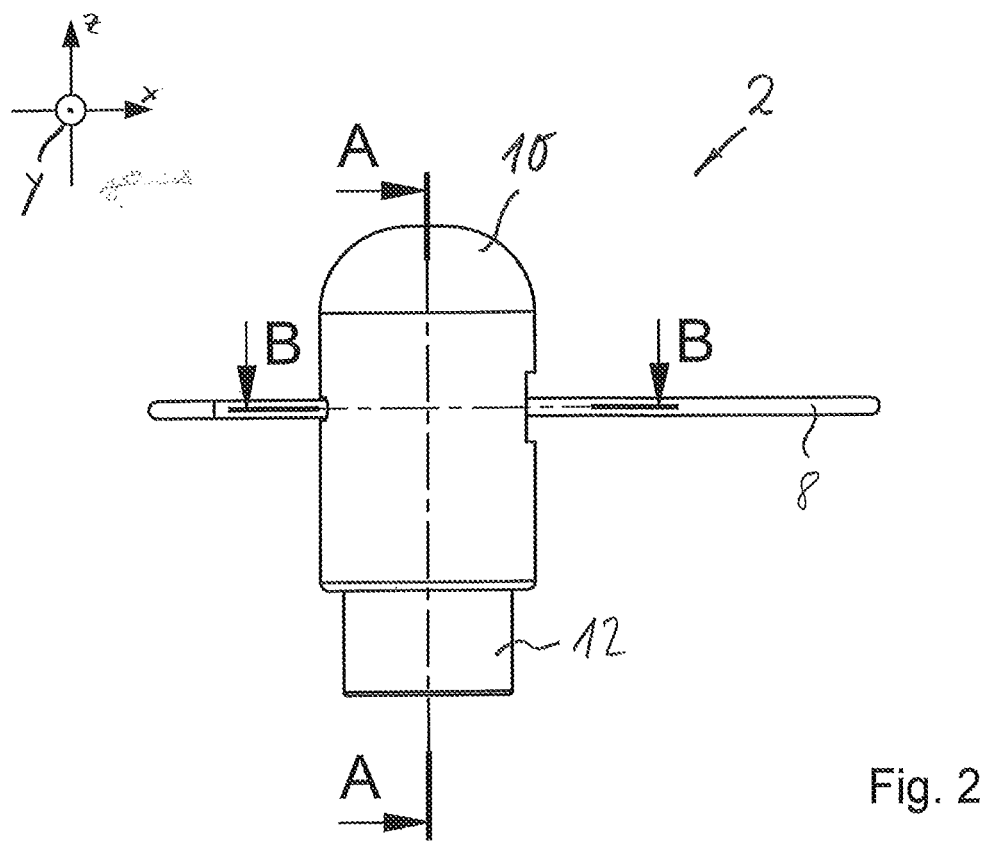
Figure 6:
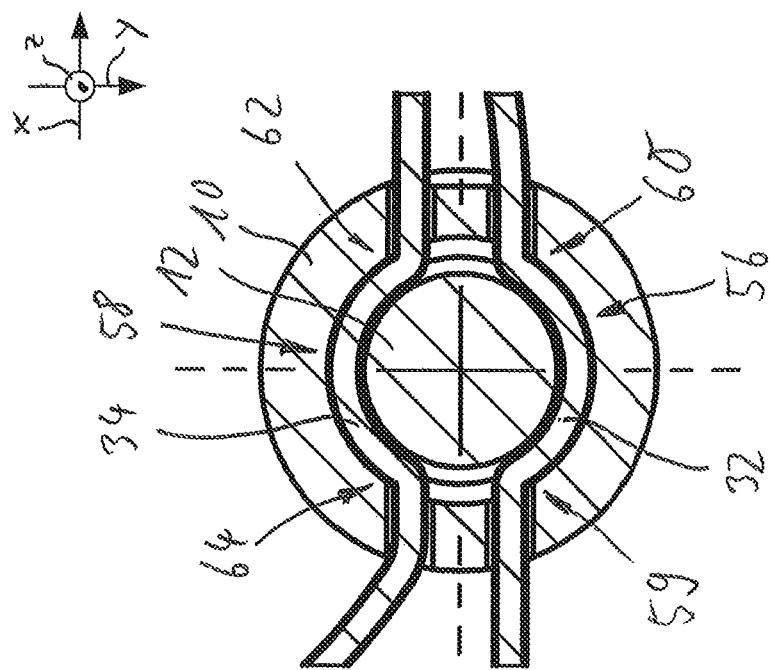
Figure 5:
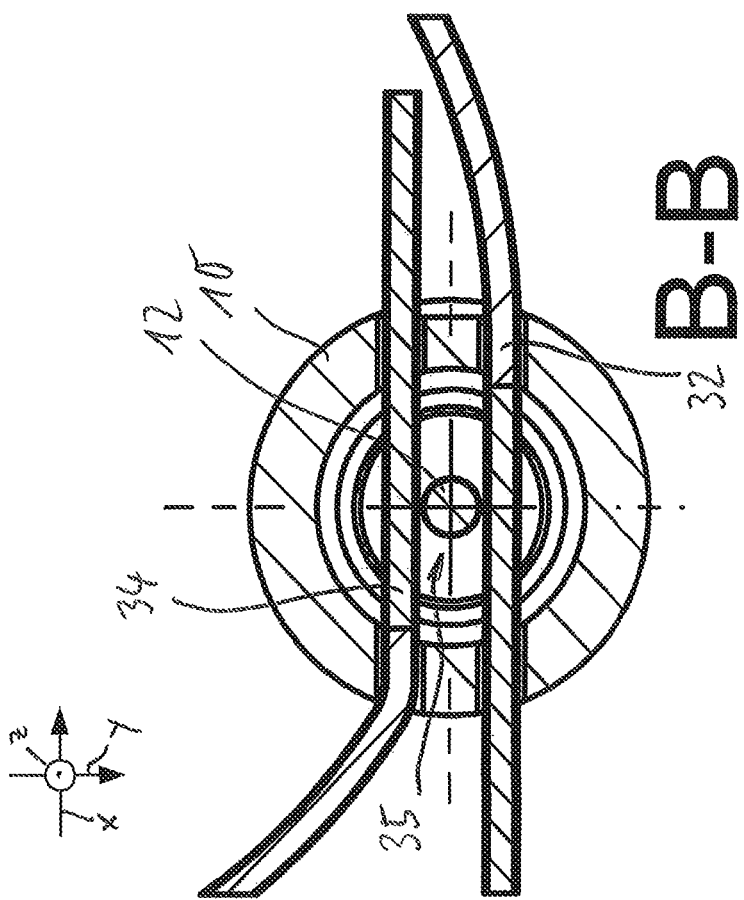
Figure 7:
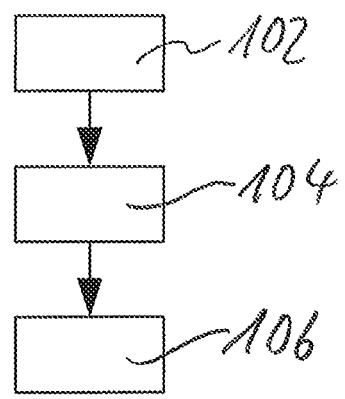

One embodiment of the present invention is explained below by way of example with reference to the accompanying drawings, in which:

FIG. 1 schematically shows an apparatus in perspective view;

FIG. 2 shows the apparatus in side view;

FIGS. 3 and 4 each schematically show the apparatus in longitudinal sectional view;

FIGS. 5 and 6 each schematically show the apparatus in cross-sectional view; and FIG. 7 schematically shows a flow diagram.

FIG. 1 schematically shows a perspective view of an apparatus 2 for arranging an electronic data carrier 4 on a component 6. The component 6 is part of a fluidic system and is for example a pipeline segment, a valve body, a drive body or an intermediate segment between a valve body and a drive body. A cable 8 is guided around the circumference of the component 6 and is presently secured in the apparatus 2 at both ends. Of course, the cable 8 can also be guided around only a portion of the component 6. Subsequent removal of the apparatus is possible by severing the cable 8.

FIG. 2 shows the apparatus 2 in side view without the component 6 shown in FIG. 1. The apparatus 2 comprises a main body 10, in which an insert 12 is initially slidably arranged. The main body 10 and the insert 12 are produced from stainless steel. In FIG. 2, the insert 12 protrudes from the main body 10 and is thus arranged in a first position with respect to the main body 10. In the first position, the cable portions of the cable 8 are movable along the longitudinal axis thereof in the apparatus 2. If the insert 12 is pushed into the main body 10, said insert is shifted into a second position. In the second position, the insert 12 locks into the main body 10 and thus secures both itself and the cable portions of the cable 8 to the main body 10 such that they cannot be pulled out.

FIG. 3 schematically shows the apparatus 2 in longitudinal section A-A from FIG. 2, the insert 12 being located in the first position with respect to the main body 10. The insert 12 has a cylindrical first guide portion 14 and a second guide portion 16 spaced apart therefrom. The first guide portion 14 axially guides the insert 12 in an inner cylinder 18 of the main body 10. The second guide portion 16 axially guides the insert 12 in an inner cylinder 20 of the main body 10. Furthermore, an annular surface of the insert 12, which surface is arranged between the guide portion 16 and a release portion 37, prevents either of the cable portions 32 or 34 from penetrating the space of the inner cylinder 20.

The main body 10 has a distal inner annular groove 22 and a proximal inner annular groove 24 in the region of the first inner cylinder 18. Corresponding thereto, the insert 12 has an outer annular groove in which an O-ring 26 is received. The O-ring 26, together with the outer annular groove of the insert 12 and the inner annular groove 22, defines the first position of the insert 12 with respect to the main body 10 in the sense of a first locking position. Furthermore, the O-ring 26, together with the outer annular groove of the insert 12 and the inner annular groove 24, defines the second position of the insert 12 with respect to the main body 10 in the sense of a second locking position.

The main body 10 has through-holes 28 and 30, through which cable portions 32 and 34 are guided in from outside the main body 10 through an inner release space 35 inside the main body 10. In the first position of the insert 12, the release portion 37 of the insert 12 vacates the release space 35 for the cable portions 32 and 34.

An inner cavity of the main body 2 is formed in multiple stages. The inner cylinder 18 and the release space 15 are therefore defined by different diameters. The release space 35 and the inner cylinder 20 are also defined by different diameters.

Alternatively to the introduction and passing through of two cable portions, it is also possible for one of the cable portions to be rigidly connected to the main body 10 and only the other cable portion is guided around the component 6 in order to subsequently be guided through the main body 10 and secured by means of the insert 12 being pushed in.

Proceeding from the release portion 37, the insert 2 has a diameter widening 36 on the side remote from the guide portion 16, which widening merges into a securing portion 40. The diameter widening 36 is frustoconical. If the insert 12 is inserted into the main body 10, the diameter widening 36 engages with the cable portions 32 and 34 and moves said portions toward a cylinder inner surface 42. The cylinder inner surface 42 and the securing portion 40 define a fixing channel (mentioned below) for each cable portion 32, 34. The securing portion 40 forces the cable portions 32, 34 into the relevant fixing channel and secures the cable portions 32, 34 to the apparatus 2 such that they cannot be pulled out.

The electronic data carrier 4 is arranged in a pot-shaped container 44, a locking element 46 in the shape of a ball clamping the electronic data carrier 4 between the base and itself. At the same time, the locking element 46 exerts a force on the wall of the container 44 in a plane that is perpendicular to the longitudinal axis 50. The container 44 is preferably produced from PTFE, polytetrafluoroethylene, and arranged in a recess 48 in the insert 12 in the sense of a press fit. An outwardly facing surface 52 of the container 44 ends so as to be flush with a distal annular surface 54 of the insert 12.

FIG. 4 schematically shows the apparatus 2 in longitudinal section, the insert 12 being located in the second position in relation to the main body 10. In the second position of the insert 12 with respect to the main body 10, a cylinder outer surface of the securing portion 40 and the cylinder inner surface 42 define the two fixing channels 56 and 58 for the respective cable portions 32 and 34.

In the second position, a distal lateral surface as part of the guide portion 14 is received in the main body 10 and the main body 10 covers said lateral surface. Furthermore, the surface 54 is flush with a distal surface 55 of the main body 10. In particular, the surfaces 52, 54 and 55 are positioned in an imagined common plane. A distance D1 between the annular grooves 22 and 24 and a distance D2 between the release portion 37 and the securing portion 40 correspond to one another.

The data carrier 4 is planar, in particular disk-shaped, and is positioned, together with the plane spanned thereby, substantially in parallel with at least one of the surfaces 52, 54 and 55. The electronic data carrier 4 is in particular an RFID chip that has a transponder, by means of which data can be read out from the data carrier 4 with the aid of a reading device arranged near the data carrier 4 and can optionally also be written into the data carrier 4.

FIG. 5 shows the apparatus 2 through cross section B-B in FIG. 2, the insert 12 being located in the first position in relation to the main body 10. The cable portions 32 and 34 can be readily inserted into the release space 35, which is vacated in the first position of the insert 12, and are movable therein.

FIG. 6 shows a schematic cross section analogously to FIG. 5, the insert 12 being located in the second position in relation to the main body 10. In the second position, the insert 12, together with the main body 10, forms the fixing channels, the fixing channel 56 comprising kinks 59 and 60. The fixing channel 58 comprises kinks 62 and 64. Each kink 59, 60, 62, 64 diverts the cable portions 32 and 34 by at least 40°, in particular by at least 45°. The cable portions 32 and 34 are thus secured to the apparatus 2 in a form-fitting manner.

FIG. 7 schematically shows a flow diagram for installing the apparatus 2. In a first step 102, the cable 8, or at least a portion thereof, is placed around the component 6. In a step 104, at least one of the cable portions 32, 34 is introduced into the apparatus 2. In a step 106, the insert 12 is pushed into the main body 10. Because the cable 8 is secured such that it cannot be pulled out, a fixed loop of the cable 8 around the component 6 is achieved.

What is claimed is:

1. An apparatus for arranging an electronic data carrier on a component of a fluidic system, wherein the apparatus comprises:
    at least one flexible cable comprising at least one flexible cable portion,
    a main body comprising an inner cavity and a through-hole connecting an outside of the main body with the cavity, and
    an insert comprising the electronic carrier, a release portion and a securing portion, wherein the insert has a diameter increase from the release portion to the securing portion, and wherein the insert can be inserted into the inner cavity of the main body, wherein in a first position of the insert with respect to the main body, the insert vacates a release space in order for the at least one flexible cable portion of the flexible cable to be introduced, wherein in a second position with respect to the main body, the insert secures itself to the main body and defines together with the main body a fixing channel for the at least one flexible cable portion, wherein the fixing channel has a kink in the course thereof for the at least one flexible cable portion such that the cable with its at least one flexible cable portion arranged in the fixing channel cannot be pulled out, and wherein in the second position of the insert with respect to the main body, a distal end surface of the insert is flush with an end surface of the main body, and wherein the electronic data carrier is arranged at a base of a container, and wherein the container is arranged in a recess in the apparatus such that the base of said container faces outwards.

2. An apparatus according to claim 1, wherein the electronic data carrier is arranged in a distal region of the insert.

3. An apparatus according to claim 1, wherein the container is produced from PTFE.

4. An apparatus according to claim 1, wherein the insert and the main body are designed such that two cable portions can be introduced and secured.

5. An apparatus according to claim 1, wherein a cable comprising the cable portion is rigidly connected to the main body.

6. An apparatus according to claim 1, wherein the insert, in the second position, is received in the main body such that a distal lateral surface of the insert is covered by the main body.

7. An apparatus according to claim 1, wherein an annular groove for securing the insert in the second position is arranged between a first and a second inner cylinder of the main body, wherein a first guide portion of the insert is axially guided in the first inner cylinder, and wherein a second guide portion of the insert is axially guided in the second inner cylinder.

* * * * *